United States Patent
Hu et al.

(10) Patent No.: US 12,391,826 B2
(45) Date of Patent: Aug. 19, 2025

(54) NOISE REDUCING FILLED POLYESTER

(71) Applicant: SABIC GLOBAL TECHNOLOGIES B.V., Bergen op Zoom (NL)

(72) Inventors: Zhaokang Hu, Newburgh, IN (US); Robert Russell Gallucci, Mt. Vernon, IN (US); Carlos Pereira, Putnam Valley, NY (US); Vasudev Shankar Nilajkar, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/659,218

(22) Filed: May 9, 2024

(65) Prior Publication Data

US 2024/0294747 A1   Sep. 5, 2024

Related U.S. Application Data

(62) Division of application No. 17/049,405, filed as application No. PCT/US2019/031515 on May 9, 2019, now Pat. No. 12,065,565.

(60) Provisional application No. 62/670,340, filed on May 11, 2018.

(51) Int. Cl.
| | |
|---|---|
| C08L 67/03 | (2006.01) |
| B32B 7/12 | (2006.01) |
| B32B 27/36 | (2006.01) |
| B60R 13/08 | (2006.01) |
| C08K 5/101 | (2006.01) |
| C08L 23/06 | (2006.01) |
| C08K 3/08 | (2006.01) |
| C08K 3/22 | (2006.01) |
| C08K 3/30 | (2006.01) |
| C08K 3/34 | (2006.01) |
| C08K 3/40 | (2006.01) |
| C08K 5/20 | (2006.01) |

(52) U.S. Cl.
CPC ............. *C08L 67/03* (2013.01); *B32B 7/12* (2013.01); *B32B 27/36* (2013.01); *B60R 13/08* (2013.01); *C08K 5/101* (2013.01); *C08L 23/06* (2013.01); *B32B 2250/03* (2013.01); *B32B 2307/102* (2013.01); *B32B 2307/72* (2013.01); *B32B 2307/732* (2013.01); *C08K 2003/0887* (2013.01); *C08K 2003/2241* (2013.01); *C08K 2003/2272* (2013.01); *C08K 2003/2296* (2013.01); *C08K 2003/3036* (2013.01); *C08K 2003/3045* (2013.01); *C08K 3/34* (2013.01); *C08K 3/40* (2013.01); *C08K 5/20* (2013.01); *C08L 2207/066* (2013.01)

(58) Field of Classification Search
CPC ...... B32B 27/36; B32B 2367/00; B60R 13/08
See application file for complete search history.

(56) References Cited

U.S. PATENT DOCUMENTS

| | | | |
|---|---|---|---|
| 5,326,793 A | 7/1994 | Gallucci et al. | |
| 5,441,997 A | 8/1995 | Walsh et al. | |
| 6,214,456 B1 * | 4/2001 | Boyd | B32B 5/22 |
| | | | 428/317.1 |
| 6,300,399 B1 | 10/2001 | Gallucci et al. | |
| 8,028,800 B2 | 10/2011 | Ravnaas | |
| 8,507,638 B2 | 8/2013 | Crawford et al. | |
| 8,916,270 B2 | 12/2014 | Malinoski et al. | |
| 2009/0318594 A1 | 12/2009 | Grothe et al. | |
| 2014/0306142 A1 | 10/2014 | Youn et al. | |
| 2017/0002196 A1 | 1/2017 | Park et al. | |
| 2017/0247527 A1 | 8/2017 | Oda et al. | |
| 2018/0001810 A1 | 1/2018 | Hwang et al. | |
| 2021/0238410 A1 | 8/2021 | Hu et al. | |

FOREIGN PATENT DOCUMENTS

| | | | |
|---|---|---|---|
| JP | 2000281886 A | | 10/2000 |
| WO | WO 98/41399 | * | 9/1998 |
| WO | 0116231 A1 | | 3/2001 |
| WO | WO 01/16231 | * | 3/2001 |

OTHER PUBLICATIONS

International Search Report for International Application No. PCT/US2019/031515, International Filing Date May 9, 2019, Date of Mailing Jul. 18, 2019, 9 pages.
Written Opinion for International Application No. PCT/US2019/031515, International Filing Date May 9, 2019, Date of Mailing Jul. 18, 2019, 8 pages.

* cited by examiner

*Primary Examiner* — Robert C Boyle
(74) *Attorney, Agent, or Firm* — CANTOR COLBURN LLP

(57) ABSTRACT

A polyester composition includes, based on the total weight of the polyester composition, a first polyester and a second polyester, wherein a weight ratio of the first polyester to the second polyester is 80:20 to 20:80, preferably 60:40 to 40:60; 5 to 60 weight percent (wt %), preferably 5 to 50 wt % of a reinforcing filler; and 5 to 60 wt %, preferably 10 to 50 wt %, more preferably 20 to 50 wt % of an inorganic filler having a specific gravity of greater than 3 grams per cubic centimeter, as determined in accordance with ASTM D792, wherein a molded article comprising the polyester composition has a sound transmission loss of greater than 30 dB, preferably 35 to 50 dB, more preferably 36 to 45 dB, as determined at 1,250 Hz according to ASTM E1050 using a molded disc with a diameter of 100 mm and a thickness of 3.2 mm.

15 Claims, No Drawings

NOISE REDUCING FILLED POLYESTER

CROSS REFERENCE TO RELATED APPLICATIONS

This application is a divisional of U.S. application Ser. No. 17/049,405, filed Oct. 21, 2020, which is a National Stage application of PCT/US2019/031515, filed May 9, 2019, which claims priority to and the benefit of U.S. Provisional Application No. 62/670,340, filed May 11, 2018 with the USPTO, the entire content of which is incorporated herein by reference.

BACKGROUND

Sound dampening or acoustic attenuation materials are used to reduce unwanted sound transmission through an article or space. Sound-absorbing or dampening materials are used, for example, in electric products, building wall materials, and vehicles. Particularly, sound dampening materials are used for reducing engine noise inside and outside of vehicles that is caused by acceleration or idling. Sound dampening materials, such acoustic shields for vehicles, desirably have excellent sound absorbency, high modulus and strength, good dimensional stability at high temperature, and high melt flow. Reducing vehicle sound emissions to the external environment is increasingly important because of future regulations related to vehicle noise reduction.

Sound transmission loss generally increases with an increase in the mass per unit area of a sound dampening material. However, it is desirable to minimize the increase in weight that results from incorporating sound dampening materials into an article. Further, it is desirable to achieve good sound dampening (i.e., increased sound transmission loss) at a range of lower frequencies, such as less than 1,800 Hertz (Hz), where sound attenuation is more difficult.

Accordingly, there is an increasing need to develop cost effective solutions to achieve quieter and more efficient vehicles.

BRIEF DESCRIPTION

Provided is a polyester composition comprising, based on the total weight of the polyester composition, a first polyester and a second polyester, wherein a weight ratio of the first polyester to the second polyester is 80:20 to 20:80, preferably 60:40 to 40:60; 5 to 60 weight percent (wt %), preferably 5 to 50 wt % of a reinforcing filler; and 5 to 60 wt %, preferably 10 to 50 wt %, more preferably 20 to 50 wt % of an inorganic filler having a specific gravity of greater than 3 grams per cubic centimeter, as determined in accordance with ASTM D792, wherein a molded article comprising the polyester composition has a sound transmission loss of greater than 30 decibels (dB), preferably 35 to 50 dB, more preferably 36 to 45 dB, as determined at 1,250 Hertz (Hz) according to ASTM E1050 using a molded disc with a diameter of 100 millimeters (mm) and a thickness of 3.2 mm.

Also provided is a multi-layer composite comprising a first layer comprising a first polyester composition; and a second layer comprising a second polyester composition, wherein the first polyester composition and the second polyester composition are each the same or different polyester composition. An article comprising the multi-layer composite is provided.

The above described and other features are exemplified by the following detailed description, examples, and claims.

DETAILED DESCRIPTION

Provided herein is a polyester composition that includes both a reinforcing filler and an inorganic filler having a high specific gravity. The polyester composition can be molded into articles having desirable sound transmission loss at lower frequencies, such as at less than 1,800 Hz. An advantage to using the high specific gravity inorganic filler in combination with the reinforcing filler is that sound transmission loss can be achieved without greatly increasing the mass per unit area of the material. Additionally, articles having polyester compositions of different densities can be co-joined with each other, for example by lamination, gluing, over molding, or the like, to provide laminates with improved sound damping characteristics. These sound damping articles and laminates including the polyester composition(s) combine the freedom of design and speed of manufacturing, for example injection molding, with the structural modulus and strength benefits of the fiber reinforced compositions. The use of polyesters, especially poly (ethylene terephthalate) (PET), also allows for the incorporation of post-consumer recycle (PCR) materials and end of life recovered polyester resins from fiber, film, and packaging operations to be reused in structural sound damping automotive parts. Further, the polyester compositions have the heat tolerance to withstand automotive painting operations, such as E-coat painting, at 180 to 220° C.

The polyester composition includes a first polyester and a second polyester different from the first polyester. The weight ratio between the first polyester and the second polyester can be varied based on the desired properties of the polyester composition. For example, the weight ratio of the first polyester to the second polyester can be 80:20 to 20:80, or 70:30 to 30:70, or preferably 60:40 to 40:60, or 50:50.

The polyester can be a poly(alkylene terephthalate). The alkylene group of the poly(alkylene terephthalate) can comprise 2 to 18 carbon atoms. Exemplary the alkylene groups include ethylene, 1,3-propylene, 1,4-butylene, 1,5-pentylene, 1,6-hexylene, 1,4-cyclohexylene, 1,4-cyclohexanedimethylene, or a combination thereof. For example, the alkylene group can be ethylene, 1,4-butylene, or a combination thereof.

The poly(alkylene terephthalate) can be, but is not limited to, poly(ethylene terephthalate) (PET), poly(butylene terephthalate) (PBT), poly(ethylene naphthanoate) (PEN), poly (butylene naphthanoate) (PBN), poly(cyclohexanedimethanol terephthalate), poly(propylene terephthalate) (PPT), or a combination thereof. For example, the poly(alkylene terephthalate) can be PET, PBT, or a combination thereof. In a preferred aspect, the poly(alkylene terephthalate) can be highly crystalline polyester such as PBT or a combination of PBT and PET.

The poly(alkylene terephthalate) can be a copolyester derived from terephthalic acid (or a combination of terephthalic acid and up to 10 mole percent isophthalic acid) and a mixture comprising a linear $C_2$-$C_6$ aliphatic diol, such as ethylene glycol or 1,4-butylene glycol), and a $C_6$-$C_{12}$ cycloaliphatic diol, such as 1,4-cyclohexane diol, 1,4-cyclohexanedimethanol, dimethanol decalin, dimethanol bicyclooctane, 1,10-decane diol, or a combination thereof. The ester units comprising the two or more types of diols can be present in the polymer chain as random individual units or as blocks of the same type of units. Specific esters of this type include poly(1,4-cyclohexylene dimethylene co-ethylene terephthalate) (PCTG) wherein greater than 50 mole percent of the ester groups are derived from 1,4-cyclohexanedimethanol; and poly(ethylene-co-1,4-cyclohexylenedimethylene terephthalate) wherein greater than or equal to 50 mole percent of the ester groups are derived from ethylene (PETG).

The poly(alkylene terephthalate)s can include small amounts (e.g., up to 10 wt %, preferably up to 5 wt %) of residues of monomers other than alkylene diols and terephthalic acid. For example, the poly(alkylene terephthalate) can include the residue of isophthalic acid. As another example, the poly(alkylene terephthalate) can comprises units derived from an aliphatic acid, such as succinic acid, glutaric acid, adipic acid, pimelic acid, 1,4-cyclohexanedicarboxylic acid, or a combination thereof.

The first polyester and/or the second polyester can each comprise, independently, one or more poly(alkylene terephthalate)s. For example, the first polyester can include a first poly(alkylene terephthalate) and a second poly(alkylene terephthalate). For example, the first polyester can include a first poly(butylene terephthalate) and a second poly(butylene terephthalate). In an aspect, the first polyester comprises a first PBT and a second PBT, and the second polyester comprises PET.

In polyester compositions having different polyesters, for example a combination of PBT and PET, each polyester can retain its individual crystallinity, as determined by distinct, separate melting points using differential scanning calorimetry (DSC). Polyester compositions having different polyesters that retain their individual crystallinities are preferred over compositions having an appreciable degree of copolymerization between different polyesters as evidenced by a single melting point by DSC. For example, the polyester composition can have at least two separate melting temperatures from 200 to 275° C., as determined by DSC, preferably wherein a first melting point corresponds to the melting temperature of the first polyester and a second melting point corresponds to the melting temperature of the second polyester. As used herein, "melting temperature" means the temperature at the melting point. The terms "melting temperature" and "melting point" are used interchangeably herein.

Dicarboxylic acids (e.g., aliphatic dicarboxylic acids, alicyclic dicarboxylic acids, aromatic dicarboxylic acids, and combinations thereof) and diols (e.g., aliphatic diols, alicyclic diols, aromatic diols, and combinations thereof) can be used to prepare the polyesters. Chemical equivalents of dicarboxylic acids (e.g., anhydrides, acid chlorides, acid bromides, carboxylate salts, or esters) and chemical equivalents of diols (e.g., esters, preferably $C_1$-$C_8$ esters such as acetate esters) can also be used to prepare the polyesters.

Aromatic dicarboxylic acids include, but are not limited to, isophthalic acid, terephthalic acid, 1,2-di(p-carboxyphenyl)ethane, 4,4'-dicarboxydiphenyl ether, 4,4'-bisbenzoic acid, or the like, and 1,4- or 1,5-naphthalene dicarboxylic acids or the like. A combination of isophthalic acid and terephthalic acid can be used. The weight ratio of isophthalic acid to terephthalic acid can be, for example, 91:9 to 2:98, or 25:75 to 2:98. Dicarboxylic acids containing fused rings that can be used to prepare the polyesters include, but are not limited to, 1,4-, 1,5-, and 2,6-naphthalenedicarboxylic acids. Exemplary cycloaliphatic dicarboxylic acids include, but are not limited to, decahydronaphthalene dicarboxylic acids, norbornene dicarboxylic acids, bicyclooctane dicarboxylic acids, and 1,4-cyclohexanedicarboxylic acids.

Aliphatic diols include, but are not limited to, 1,2-ethylene glycol, 1,2- and 1,3-propylene glycol, 2,2-dimethyl-1, 3-propane diol, 2-ethyl-2-methyl-1,3-propane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol and its cis- and trans-isomers, triethylene glycol, 1,10-decane diol, or the like, or combinations thereof. For example, the diol can be ethylene or 1,4-butylene diol. For example, the diol can be ethylene glycol including 0.5 to 5.0 wt % of diethylene glycol. Exemplary aromatic diols include, but are not limited to, resorcinol, hydroquinone, pyrocatechol, 1,5-naphthalene diol, 2,6-naphthalene diol, 1,4-naphthalene diol, 4,4'-dihydroxybiphenyl, bis(4-hydroxyphenyl)ether, bis(4-hydroxyphenyl)sulfone, or the like, or combinations thereof.

The poly(alkylene terephthalate) can be PBT that is obtained by polymerizing a glycol component comprising at least 70 mole percent (mol %), preferably at least 80 mol % of tetramethylene glycol (1,4-butanediol), and an acid component comprising at least 70 mol %, preferably at least 80 mol %, of terephthalic acid or polyester-forming derivatives thereof. Commercial examples of PBT include those available as VALOX 315 and VALOX 195, manufactured by SABIC.

The poly(alkylene terephthalate) can be a modified PBT, that is, a PBT derived in part from PET, for example recycled PET from used soft drink bottles. The PET-derived PBT polyester (referred to herein for convenience as a "modified PBT") can be derived from a PET component such as PET, a PET copolymer, or a combination thereof. The modified PBT can further be derived from biomass-derived 1,4-butanediol, e.g., corn-derived 1,4-butanediol or a 1,4-butanediol derived from a cellulosic material. Unlike conventional molding compositions containing virgin PBT (PBT that is derived from 1,4-butanediol and terephthalic acid monomers), the modified PBT contains units derived from ethylene glycol and isophthalic acid. Use of modified PBT can provide a valuable way to effectively use under-utilized scrap PET (from post-consumer or post-industrial streams) in PBT thermoplastic molding compositions, thereby conserving non-renewable resources.

The modified PBT can have at least one residue derived from the PET component. Exemplary residues include ethylene glycol residues, diethylene glycol residues, isophthalic acid residues, antimony-containing residues, germanium-containing residues, titanium-containing residues, cobalt-containing residues, tin-containing residues, aluminum, aluminum-containing residues, 1,3-cyclohexane dimethanol residues, 1,4-cyclohexane dimethanol residues, alkali salts and alkaline earth metal salts including calcium and magnesium and sodium and potassium salts, phosphorous-containing residues, sulfur-containing residues, naphthalene dicarboxylic acid residues, 1,3-propanediol residues, or combinations thereof.

Depending on factors such as the types and relative amounts of PET and PET copolymers, the residue can include various combinations. For example, the residue can include mixtures of units derived from ethylene glycol groups and diethylene glycol groups. The residue can also include mixtures of units derived from ethylene glycol, diethylene glycol, and isophthalic acid. The residue derived from PET and PET copolymers can be selected from the group consisting of cis-1,3-cyclohexanedimethanol residues, cis-1,4-cyclohexane dimethanol residues, trans-1,3-cyclohexanedimethanol residues, trans-1,4-cyclohexanedimethanol residues, or combinations thereof. The residue can also include a mixture of units derived from ethylene glycol, diethylene glycol, isophthalic acid, cis-1,4-cyclohexane dimethanol, trans-1,4-cyclohexanedimethanol, or a combination thereof. The residue derived from PET and PET copolymers can also include mixtures of units derived from ethylene glycol, diethylene glycol, cobalt-containing compounds, and isophthalic acid.

Commercial examples of modified PBT resins include those available under the trade name VALOX iQ, manufactured by SABIC. The modified PBT can be derived from the PET component by any method that involves depolymerization of the PET component and polymerization of the depolymerized PET component with 1,4-butanediol to provide the modified PBT. For example, the modified PBT component can be made by a process that involves depolymerizing a PET or PET copolymer, with a 1,4-butanediol component at a temperature from 180 to 230° C., under agitation, at a pressure that is at least atmospheric pressure in the presence of a catalyst component, at an elevated temperature, under an inert atmosphere, to produce a molten mixture containing an oligomer containing ethylene terephthalate moieties, an oligomer containing ethylene isophthalate moieties, an oligomer containing diethylene terephthalate moieties, an oligomer containing diethylene isophthalate moieties, an oligomer containing butylene terephthalate moieties, an oligomer containing butylene isophthalate moieties, a covalently bonded oligomeric moiety containing at least two of the foregoing moieties, 1,4-butanediol, ethylene glycol, or a combination thereof; and agitating the molten mixture at sub-atmospheric pressure and increasing the temperature of the molten mixture to an elevated temperature under conditions sufficient to form a modified PBT containing at least one residue derived from the PET component.

The polyester composition can include a combination of virgin poly(alkylene terephthalate) and modified poly(alkylene terephthalate), including a combination of virgin and modified PBT, the latter obtained from recycled PET as described above.

The polyesters can be obtained by interfacial polymerization or melt-process condensation, by solution phase condensation, or by transesterification polymerization wherein, for example, a dialkyl ester such as dimethyl terephthalate can be transesterified with ethylene glycol using acid catalysis, to generate PET. It is possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

A catalyst component facilitates the reaction, and can be selected from antimony compounds, tin compounds, cobalt compounds, titanium compounds, combinations thereof as well as many other metal catalysts and combinations of metal catalysts that have been disclosed in the literature. The amount of the catalyst can be in a range from 1 to 5,000 ppm, or more.

The polyester (e.g., poly(alkylene terephthalate)) can have an intrinsic viscosity of 0.4 to 2.0 deciliter/gram (dl/g), as measured in a 60:40 phenol/tetrachloroethane mixture at 25° C. For example, the polyester has an intrinsic viscosity of 0.5 to 1.5 dl/g, preferably 0.6 to 1.2 dl/g, as measured in a 60:40 phenol/tetrachloroethane mixture at 25° C.

The first polyester and the second polyester can have different intrinsic viscosities. For example, the first polyester comprises a first poly(butylene terephthalate) and a second poly(butylene terephthalate), wherein the intrinsic viscosity of the first poly(butylene terephthalate) is different than the intrinsic viscosity of the second poly(butylene terephthalate) different intrinsic viscosities, preferably wherein the first poly(butylene terephthalate) has an intrinsic viscosity of 0.6 to 0.8 dl/g and the second poly(butylene terephthalate) has an intrinsic viscosity of 1.0 to 1.4 dl/g, each as measured in a 60:40 phenol/tetrachloroethane mixture at 25° C.

The polyester (e.g., poly(alkylene terephthalate)) can have a weight average molecular weight (Mw) of 10,000 to 200,000 grams per mole (g/mol), preferably 50,000 to 150,000 g/mol, as measured by gel permeation chromatography (GPC) using polystyrene standards. If a poly(alkylene terephthalate) having a Mw of less than 10,000 g/mol is used, the mechanical properties of the articles molded from the polyester composition can be unsatisfactory. On the other hand, if a poly(alkylene terephthalate) having a Mw of greater than 200,000 g/mol is used, the moldability can be insufficient. The poly(alkylene terephthalate) can be a mixture of two or more poly(alkylene terephthalate)s having different intrinsic viscosities and/or weight average molecular weights.

The polyester (e.g., poly(alkylene terephthalate)) can have a the carboxylic end group (CEG) concentration of 1 to 70 millimole equivalents per kilogram (meq/kg), preferably 5 to 60 meq/kg, more preferably 10 to 50 meq/kg, as determined according to ASTM D7409-15.

The polyester (e.g., poly(alkylene terephthalate)) can have a melting temperature ($T_m$) of 200 to 275° C., preferably 210 to 265° C., more preferably 210 to 260° C., as determined by differential scanning calorimetry (DSC).

The polyester can further include a phosphorous compound, for example at least 20 parts per million by weight (ppm) of a phosphorous compound, for example 20 to 200 ppm or 20 to 100 ppm, which can stabilize melt viscosity and deactivate residual polymerization catalysts. For example, the polyester comprises a PET that includes at least 20 ppm of a phosphorous compound. The polyester, for example PET, can further include a cobalt compound. Phosphorous compounds and cobalt compounds include, but are not limited to, those provided herein.

The polyester composition further includes a reinforcing filler. The reinforcing filler can be glass fiber, glass flake, fiber glass, chopped glass, mica, or a combination thereof, preferably glass fiber. The reinforcing filler is present in an amount of 5 to 60 wt %, preferably 5 to 50 wt %, more preferably 10 to 50 wt %, based on the total weight of the polyester composition.

The glass fiber can be E, A, C, ECR, R, S, D, or NE glasses, or the like, or a combination thereof. The glass fibers can be made by standard processes, e.g., by steam or air blowing, flame blowing, and mechanical pulling. Exemplary glass fibers are made by mechanical pulling.

The glass fibers can be sized or unsized. Sized glass fibers are coated on their surfaces with a sizing composition selected for compatibility with the polyester components. The sizing composition facilitates wet-out and wet-through of the polyesters upon the fiber strands and assists in attaining desired physical properties in the polyester composition. For example, the glass fiber can be sized with a coating agent that is present in an amount from 0.1 to 5 wt %, preferably 0.1 to 2 wt %, based on the weight of the glass fibers. Fiber coating is preferred for better handing of the chopped glass and adhesion to the polyester, which can provide for superior mechanical properties.

In preparing the glass fibers, a number of filaments can be formed simultaneously, sized with the coating agent, and then bundled into what is called a strand. Alternatively the strand itself may be first formed of filaments and then sized.

The amount of sizing employed is generally that amount which is sufficient to bind the glass filaments into a continuous strand and ranges from 0.1 to 5 wt %, preferably 0.1 to 2 wt %, based on the weight of the glass fibers.

The glass fiber can be continuous or chopped. Glass fibers in the form of chopped strands may have a length of 0.3 millimeters (mm) to 10 centimeters (cm), preferably 0.5 mm to 5 cm, more preferably 1.0 mm to 2.5 cm. For example, the glass fiber can have a length from 0.2 to 20 mm, preferably 0.2 to 10 mm, more preferably 0.7 to 7 mm. In this area, where a thermoplastic composition is reinforced with glass fibers in a composite form, fibers having a length of 0.4 mm or more are referred to as long fibers, and shorter ones are referred to as short fibers.

The glass fiber can have a round (or circular), flat, or irregular cross-section. Thus, use of non-round fiber cross sections is not excluded. For example, the glass fiber can have a circular cross-section. The diameter of the glass fiber can be from 1 to 15 micrometers ($\mu$m), preferably 4 to 10 $\mu$m, more preferably 1 to 10 $\mu$m, even more preferably 7 to 10 $\mu$m. For example, the glass fiber can have a diameter of 10 $\mu$m. In some aspects, flat glass fibers may be preferred for low warp high strength articles.

Other exemplary reinforcing fillers include, but are not limited to, glass spheres such as hollow and solid glass spheres, silicate spheres, or the like; kaolin, including hard kaolin, soft kaolin, calcined kaolin, kaolin comprising various coatings known in the art to facilitate compatibility with the polymer matrix, or the like; fibers (including continuous and chopped fibers) such as carbon fibers; flaked fillers such as glass flakes, flaked silicon carbide, aluminum oxides, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic polymers, poly(vinyl alcohol) or the like; as well as mica, clay, talc, wollastonite, feldspar, perlite, tripoli, diatomaceous earth, carbon black, or the like, or combinations thereof. Milled glass, glass flake, glass or ceramic bubbles, and spheres may also be used as less isotropic fillers. Combination of glass fiber with platy fillers such as glass flake or mica may be beneficial in producing molded articles with high strength and reduced warp with better flatness and improved dimensional stability over use of only cylindrical glass fibers alone.

The reinforcing fillers can be provided in the form of monofilament or multifilament fibers and can be used either alone or in combination with other types of fiber, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree Fabrics or the like; non-woven fibrous reinforcements such as continuous strand mat, chopped strand mat, tissues, papers and felts or the like; or three-dimensional reinforcements such as braids.

The polyester composition further includes an inorganic filler. The inorganic filler can be present in an amount of 5 to 60 wt %, preferably 10 to 50 wt %, preferably 15 to 50 wt %, even more preferably 20 to 50 wt %, based on the total weight of the polyester composition.

The inorganic filler has a specific gravity of greater than 3 grams per cubic centimeter ($g/cm^3$), as determined in accordance with ASTM D792. Representatives of such high specific gravity filler materials include metal (or metal alloy) powders, such as tungsten powder, metal salts, and metal complexes, but are not limited thereto. Examples of inorganic filler materials which can be included and their respective specific gravities are tungsten (19.35), bismuth (9.78), nickel (8.9), molybdenum (10.2), iron (7.86), copper (8.94), brass (8.2-8.4), bronze (8.7-8.74), cobalt (8.92), zinc (7.14), tin (7.31), and silver (10.50). Alloys or blends of these filler materials can also be used, and the materials can be optionally coated with a coating such as $C_{60}$. The specific gravities provided herein are exemplary and the materials identified can have different specific gravities depending on the specific material used and tested, and the material's treatment. The particle size can be from 0.1 to 50 microns ($\mu$m), preferably from 1 to 15 $\mu$m, and more preferably 1 to 10 $\mu$m.

Exemplary inorganic fillers include a metal oxide, sulfate, or sulfide salt such as barium sulfate, zinc oxide, zinc sulfide, titanium dioxide, iron oxide, or a combination thereof. The metal salt can be in the form of a naturally occurring species or synthetically derived using suitable synthetic techniques.

In an aspect, the inorganic filler and/or the polymer composition does not include lead, mercury, cadmium, thallium, arsenic, a salt thereof, a complex thereof, or any combination thereof. In an aspect, the inorganic filler and/or the polymer composition does not include water soluble barium compounds such as barium chloride or barium nitrate.

The polyester composition can further include an impact modifier. Exemplary impact modifiers can be high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a $T_g$ less than 10° C., preferably less than −10° C., or more preferably −40° to −80° C., and (ii) a rigid polymeric superstrate grafted to the elastomeric polymer substrate. Exemplary elastomeric phase materials include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric ($C_{1-8}$ alkyl) (meth)acrylates; elastomeric copolymers of ($C_{1-8}$ alkyl) (meth)acrylates with butadiene or styrene; or combinations thereof. Exemplary materials for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, preferably methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). For example, the impact modifier can be an alkyl (meth)acrylate copolymer, (meth)acrylic ester-butadiene-styrene, acrylonitrile-butadiene-styrene, styrene-butadiene, styrene-ethylene-butylene-styrene, a poly(ether ester) block copolymer, a polyethylene-α olefin copolymer, styrene-isoprene-styrene triblock copolymer, or a combination thereof.

Impact modifiers can be present in amounts of 1 to 30 wt %, preferably 1 to 20 wt %, more preferably 1 to 15 wt %, based on the total weight of the polymer composition.

The polyester composition can further include additives ordinarily incorporated into polymer compositions of this type, with the proviso that the additive(s) are selected so as to not significantly adversely affect the desired properties of the polyester composition. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as carbon black and organic dyes, surface effect additives, radiation stabilizers, flame retardants, and anti-drip agents. A combination of additives can be used, for example a combination of a mold release agent, a stabilizer, and a filler. In general, the additives are used in the amounts generally known to be effective. For example, the total amount of the additives (other than the reinforcing filler, inorganic filler, and optionally the impact modifier) can be 0.01 to 5 wt %, based on the total weight of the polyester composition.

Heat stabilizers include organophosphites (e.g. triphenyl phosphite, tris-(2,6-dimethylphenyl)phosphite, tris-(mixed mono- and di-nonylphenyl)phosphite or the like), phosphonates (e.g, dimethylbenzene phosphonate or the like), or combinations thereof. The heat stabilizer can be tris(2,4-di-t-butylphenyl) phosphite available as IRGAPHOS™ 168.

There is considerable overlap among plasticizers, lubricants, and mold release agents, which include, for example, glycerol tristearate (GTS), phthalic acid esters (e.g, octyl-4,5-epoxy-hexahydrophthalate), tris-(octoxycarbonylethyl) isocyanurate, tristearin, di- or polyfunctional aromatic phosphates (e.g, resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g, alkyl stearyl esters, such as, methyl stearate, stearyl stearate, and the like), alkyl amides such as ethylene bis stearamide (EBS), waxes (e.g, beeswax, montan wax, paraffin wax, or the like), or combinations thereof.

Fillers can include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; talc, including fibrous, modular, needle shaped, lamellar talc, or the like; wollastonite; surface-treated wollastonite; cenospheres, aluminosilicate (armospheres), or the like; single crystal fibers or "whiskers" such as silicon carbide, alumina, boron carbide, or the like. Hollow or solid glass or ceramic spheres can be used.

The polyester composition can include an antioxidant, for example a hindered phenol, phosphite, phosphonite, thioester, or a combination thereof. Antioxidants include phosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite, trilauryl phosphite, trioctadecyl phosphite, diisodecyl pentaerythritol diphosphite, tristearyl sorbitol triphosphite, and tetrakis(2,4-di-tert-butylphenyl)-4,4'-biphenylene diphosphonite; phosphonites such as tetrakis(2,4-di-tert-butylphenyl)4,4'-biphenylene diphosphonite; sterically hindered phenols such as octadecyl-3,5-di-t-butyl-4-hydroxy hydrocinnamate, tetrakis[methylene(3,5-di-tert-butyl-4-hydroxyhydrocinnamate)] methane, 1,2-bis(3,5-di-t-butyl4-hydroxyhydrocinnamoyl)hydrazine, 1,3,5-tris(3,5-di-t-butyl-4-hydroxybenzyl)-s-triazine-2,4,6(1H,3H, 5H)trione, 1,3,5-tris(4-t-butyl-3-hydroxy-2,6-dimeth 2,4,6-(1H,3H,5H)trione, 1,3,5-trimethyl-2,4,6-tris(3,5-di-t-butyl-4-hydroxybenzyl)benzene, 3,5-di-t-butyl-4-hydroxyhydrocinnamic acid triester with 1,3,5-tris(2-hydroxyethyl)-5-triazine-2,4,6(1H,3H,5H)-trione, and bis(3,3-bis(4-hydroxy-3-t-butylphenyl)butanoic acid)glycolester; thioesters such as bis-dodecyl 3,3'-thiodipropionate, bis-octadecyl 3,3'-thiodipropionate, dimyristyl thiodipropionate, ditridecyl thiodipropionate, mixed esters (lauryl and stearyl) of thiodipropionic acid, pentaerythritol tetrakis(3-(dodecylthio) propionate), and thioesters of di-, tri- or tetra-carboxylic acids; phosphonates such as dimethylbenzene phosphonate or the like, organic phosphates such as trimethyl phosphate; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; amides of beta-(3,5-di-tert-butyl-4-hydroxyphenyl)-propionic acid, or combinations thereof. The polyester composition can include 0.01 to 0.5 wt %, preferably 0.01 to 0.3 wt % of the antioxidant stabilizer, based on the total weight of the polyester composition.

Exemplary flame retardants include organic compounds that include phosphorus, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide.

Halogenated materials can be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,2-bis-(2,6-dichlorophenyl)-ethane; 1,1-bis-(2-chloro-4- methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxides, can also be used with the flame retardant.

Alternatively, the polyester composition can be essentially free of chlorine and bromine. "Essentially free of chlorine and bromine" is defined as having a bromine or chlorine content of less than or equal to 100 ppm, less than or equal to 75 ppm, or less than or equal to 50 ppm, based on the total weight of the polyester composition.

Anti-drip agent include, for example, a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion.

A thermoplastic polymer different from the first and second polyesters can be present. Exemplary thermoplastic polymers include polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylene sulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination thereof. In some aspects, no additional polymer is present. Polyvinyl chloride (PVC) and other aliphatic chlorinated polymers are generally avoided since they are not thermally stable under polyester processing conditions (200 to 300° C.). In an aspect, the polyester composition further includes linear low density polyethylene (LLDPE).

The method of preparing the polyester composition can be carried out using any suitable technique. One convenient method comprises blending the polyesters, reinforcing filler, inorganic filler, and other optional ingredients in powder or granular form, extruding the blend under temperature sufficient to melt the polyesters, and comminuting into pellets or other suitable shapes. The components are combined in any usual manner, e.g., by dry mixing or by mixing in the melted state in an extruder, on a heated mill or in other mixers.

Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between 230 and 350° C. in the molten polyester composition, although higher temperatures can be used provided that the residence time of the polyesters in the processing equipment is kept short. The melt processed polyester composition can exit the processing equipment such as an extruder through small exit holes in a die. The resulting strands of molten resin are cooled by passing the strands through a water bath. The strands can be cut into pellets and further dried before molding.

Despite the high specific gravity and high level of inorganic filler, the polyester compositions can be molded into useful shaped articles by a variety of means such as injection molding, extrusion, rotational molding, blow molding, and thermoforming. For example, good results are obtained in an injection molding machine, e.g. of the 80 ton Van Dorn type, with temperatures that depend on the particular polyester blends utilized. If necessary, depending on the molding properties of the polyesters, the amount of additives, and the rate of crystallization of the polyester component, those skilled in the art will be able to make the necessary adjustments in molding cycles to accommodate the polyester compositions. Additives used to enhance polyester crystallization, such as alkaline and alkaline earth carboxylates, for example sodium stearate, potassium oleate, or calcium stearate, and talc, used either alone or in any combination, are useful to speed polyester crystallization. Faster crystallization can result in molded articles with better and more consistent properties and that can be prepared by shorter, more efficient, molding cycles.

The molded article comprising the polyester composition has a sound transmission loss (STL) of greater than 30 decibels, preferably 35 to 50 decibels, more preferably 36 to 45 decibels, even more preferably 37 to 45 decibels as determined at 1250 Hertz according to ASTM E1050 using a molded disc with a diameter of 100 mm and a thickness of 3.2 mm. The STL is a measurement of the reduction of sound intensity, measured in decibels (dB) caused by a sample of the polyester composition at a selected wavelength. Greater STL values indicate more sound loss (i.e., more effective sound blocking).

The molded article comprising the polyester composition can have a melting viscosity of from 200 to 900 Poise (P), measured in accordance with ISO11443/ASTM 3835-16 at 260° C. and a shear rate of 640 l/s.

The molded article comprising the polyester composition can have a tensile modulus of elasticity of from 3,000 MPa to 20,000 MPa, more preferably 6,000 to 20,000 MPa, measured in accordance with ASTM D638, and the tensile strength at yield can be from 50 to 200 MPa, more preferably 50 to 150 MPa, measured in accordance with ASTM D638.

The molded article comprising the polyester composition can have a specific gravity of 1.2 to 4 grams per cubic centimeter (g/cm$^3$), as determined in accordance with ASTM D792. For example, the polyester composition can have a specific gravity of 1.5 to 3.5 g/cm$^3$, or 1.8 to 3.5 g/cm$^3$, or 1.2 to 2.0 g/cm$^3$, or 1.5 to 2.0 g/cm$^3$, or 2.1 to 3.5 g/cm$^3$, or 2.3 to 3.5 g/cm$^3$, as determined in accordance with ASTM D792.

The molded article comprising the polyester composition can have a heat deflection temperature (HDT) of 200 to 250° C., as determined in accordance with ASTM D648 at 0.45 MPa.

The molded article comprising the polyester can have a melt volume flow rate of 20 to 50 cm$^3$/10 minutes, as determined at 260° C./1.2 kg in accordance with ASTM-D1238-10.

Also provided herein is a multi-layer composite that comprises a first layer comprising a first polyester composition and a second layer comprising a second polyester composition. In the composite, the first polyester composition and the second polyester composition are the same or different. For example, the first and second polyester compositions can be the same. Alternatively, the first and second polyester compositions are different.

The composite can further include one or more additional layer(s), wherein each additional layer is the same or different, and is a polyester composition that is the same as or different than the first polyester composition and the second polyester composition. For example, 1, 2, 3, 4, 5, 6, 7, 8, 9, or 10 additional layers can be included in the composite to provide a multi-layer composite having 3, 4, 5, 6, 7, 8, 9, 10, 11, or 12 total layers.

An adhesive layer can be disposed between the first layer and the second layer. Any suitable adhesive material can be used to form the adhesive layer, for example a cyanoacrylate adhesive or the like. The adhesive layer can have a thickness of 0.0001 to 0.01 mm. An adhesive layer can also be used to adhere one or more additional layer(s) to the opposite sides of the first or second layers. Each subsequently added additional layer can then connected to the previously added additional layer using an adhesive layer.

The composite can have any dimensions based on the desired use. For example, the composite can have a total thickness of 1 to 30 mm, preferably 2 to 25 mm, more preferably 2 to 20 mm. For example, the composite can have a length 10 to 300 mm, preferably 20 to 250 mm, more preferably 20 to 200 mm. For example, the composite can have a width of 10 to 300 mm, preferably 20 to 250 mm, more preferably 20 to 200 mm. Preferably the length and the width are the same or different, and are each independently at least one order of magnitude greater (i.e., ten times greater) than the total thickness.

For example, the composite can have a thickness of 1 to 30 mm, a length of 10 to 300 mm, and a width of 10 to 300 mm. For example, the composite can have a thickness of 2 to 25 mm, a length of 20 to 250 mm, and a width of 20 to 250 mm. For example, the composite can have a thickness of 2 to 20 mm, a length of 20 to 200 mmm, and a width of 20 to 200 mm. For example, the composite can have a thickness of 1 to 5 mm and a length and width that are each independently 10 to 200 mm. For example, the composite can have a thickness of 1 to 3 mm and a length and width that are each independently 10 to 100 mm.

T the first and second layers can include first and second polyester compositions that are substantially the same or similar. For example, the first polyester composition and the second polyester composition can each independently have a specific gravity of 1.5 to 3.5 g/cm$^3$, preferably 1.8 to 3.5 g/cm$^3$, as determined in accordance with ASTM D792.

Alternatively, the first and second layers can include first and second polyester compositions that are different. For example, the first polyester composition can have a specific gravity of 1.2 to 2.0 g/cm$^3$, preferably 1.5 to 2.0 g/cm$^3$ and the second polyester composition can have a specific gravity of 2.1 to 3.5 g/cm$^3$, preferably 2.3 to 3.5 g/cm$^3$, as determined in accordance with ASTM D792.

Also provided is a method for manufacturing the multi-layer composite. The method includes providing a first layer precursor comprising the first polymer composition and a second layer precursor comprising the second polymer composition; and contacting the first layer precursor and the second layer precursor to provide the multi-layer composite. Optionally, an adhesive layer can be applied to one or both of the layer precursors prior to the contacting. Additional layers can be added by contacting each additional layer and the first or second layer of the composite, or by contacting each additional layer to another additional layer that has already been added to the composite.

Also provided is an article that includes the multi-layer composite. For example, a sound insulating component can include the multi-layer composite. Preferably, the sound insulating component is an automotive component. Other non-limiting examples of articles include, but are not limited to, instrument enclosures, speaker enclosures, firewalls, instrument panels, trunk partitions, wheel wells, spare tire enclosures, heating and cooling ducts, fans, blowers, body panels, fenders, doors, underbody panels, resonators, muffler shrouds, radiator enclosures, pump casings and impellers, air diverters, valve covers, oil pans, transmission and differential gear casings, head liners, flooring, or the like. This disclosure is further illustrated by the following examples, which are non-limiting.

EXAMPLES

The materials used for the examples are provided in Table 1.

TABLE 1

| Material | Description | Source |
|---|---|---|
| PBT-1 | Poly(butylene terephthalate) with an intrinsic viscosity of 0.66 dl/g as measured in a 60:40 mixture of phenol/tetrachloroethane at 25° C., 17 meq/Kg COOH, $T_m$ 215° C., weight average molecular weight = 53,400 g/mol (available under the trade name VALOX 195). | SABIC |

TABLE 1-continued

| Material | Description | Source |
|---|---|---|
| PBT-2 | Poly(butylene terephthalate) with an intrinsic viscosity of 1.2 dl/g as measured in a 60:40 mixture of phenol/tetrachloroethane at 25° C., 38 meq/Kg COOH, $T_m$ 217° C., weight average molecular weight = 110,000 g/mol (available under the trade name VALOX 315). | SABIC |
| PET | Poly(1,2-ethylene terephthalate), intrinsic viscosity of 0.535 dl/g as measured in phenol/tetrachloroethane (60:40) at 25° C., having 0.8 wt % of diethylene glycol (DEG), 20 meq/Kg COOH, $T_m$ 245° C., >20 ppm P (available under the trade name ARRAY 30161). | DAK Americas |
| GF | Glass fibers, 10 micrometer diameter PBT glass fiber, CAS Reg. No. 65997-17-3. | PPG Industries |
| BaSO$_4$ | Barium sulfate, 7 micron, CAS# 7727-43-7 (available under the tradename HUBERITE 7). | Huber Engineered |
| Tungsten | $C_{60}$-coated tungsten powder, 25 micron, CAS Reg. No. 7440-33-7. | Buffalo Tungsten |
| Iron oxide | Dark red iron oxide $Fe_2O_3$, 0.7 micron, CAS Reg. No. 1309-37-1. | Lanxess |
| ZnO | Zinc oxide, 0.3 micron, USP, CAS Reg. No. 1314-98-3 (available under the tradename ZOCO 103). | Zochem Inc. |
| ZnS | Zinc sulfide, 0.6 micron, CAS Reg. No. 1314-98-3 (available under the tradename SACOLITH HDS). | Sachtleben Chemie GmbH |
| Coated TiO$_2$ | Coated titanium dioxide, density 4.1 g/cm$^3$, average particle size of 0.25 micron (available under the tradename KRONOS 2233). | Kronos |
| Fine talc | Talcum, $Mg_3Si_4O_{10}(OH)_2$ having an average particle size <0.90 micrometer, CAS Reg. No. 14807-96-6. | Lonza |
| EBS wax | Ethylene bis stearamide, CAS Reg. No. 110-30-5 (available under the tradename ACROWAX C). | BASF |
| AO | Octadecyl 3-(3,5-di-tert-butyl-4-hydroxyphenyl)propionate, CAS Reg. No. 2082-79-3 (available under the trade name IRGANOX 1076). | Addivant |
| LLDPE | Linear Low Density Polyethylene, melt index 20 g/10 min at 190° C./2.16 kg (D1238), density 0.924 g/cm$^3$, melting point 122° C. (DSC), CAS Reg. No. 9019-29-8. | Nova Chemicals |

Samples were prepared as follows. The components were pre-mixed in a paint shaker and then extruded under a minimal vacuum on a single screw extruder having a screw size of 10.16 cm. Resultant pellets were dried for 3 to 4 hours at 120° C. in a forced air-circulating oven. Injection molding using the resultant pellets was performed on an 80 ton van Dorn injection molding machine at 220 to 260° C. with a 30 second cycle time and mold temperature of 120° C. The extrusion conditions are shown in Table 2.

TABLE 2

| Zone 1 Temp | ° C. | 150 |
|---|---|---|
| Zone 2 Temp | ° C. | 240 |
| Zone 3 Temp | ° C. | 260 |
| Zone 4 Temp | ° C. | 260 |
| Zone 5 Temp | ° C. | 250 |
| Zone 6 Temp | ° C. | 250 |
| Zone 7 Temp | ° C. | 250 |
| Screw speed | rpm | 100 |

Melt viscosity (MV) was determined using a capillary rheometer at 260° C. with a shear rate of 640 radians per second (rad/s) according to ASTM D3835-16. Melting temperature ($T_m$) was determined by differential scanning calorimetry (DSC) using heating/cooling rates of 20° C./min, and the melting temperatures determined at the endotherm peak maxima of the second heating cycle. Carboxylic end group (CEG) concentration was determined by equivalence-point titration according to ASTM D7409-15 and is reported as millimole equivalents per kilogram (meq/kg). Specific gravity (Sp. G.) was measured as per ASTM D 792. Tensile properties were measured on 3.2 mm type I bars as per ASTM method D638 at 23° C. with a crosshead speed of 50 mm/min as tangent. Tensile strength was measured at yield. Heat deflection temperature (HDT) was measured on 3.2 mm bars as per ASTM D648 (0.45 MPa or 66 psi stress) at a heating rate of 120° C./hr. Glass transition temperature ($T_g$) was determined by dynamic mechanical analysis (DMA) and is a composite value of the mix of the polyesters in the sample. DMA was performed on a 3.2 mm molded part with a 3° C./min heating rate.

Sound transmission loss (STL) was measured at a frequency range of 400 to 1,600 Hertz (Hz) using an impedance tube according to ISO 10534-2/ASTM E1050, and is reported as the average from three test samples. The STL is a measurement of the reduction of sound intensity, measured in decibels (dB) caused by the sample at a selected wavelength. Greater STL values indicate more sound loss (i.e., more effective sound blocking). Samples having a diameter of 100 mm and a thickness of 3.2 mm were prepared by machining molded disks of a diameter of 101.6 mm and a thickness of 3.2 mm.

The impedance tube device measures the ratio of the airborne sound power to the sound power transmitted by a partition comprising the sample. The device includes precision testing tubes that are equipped with microphones and sound sources. The test samples were inserted into the impedance tube at a location between a source and a receiver. The source in the impedance tube emits precisely quantified sound, and the receivers measure the sound pressure level at specific locations along the length of the tube. The normal incident acoustic properties of the sample were calculated based on frequency response functions measured between the various measurement locations.

Sound transmission loss (STL) was calculated in dB using Equation 1:

$$STL = 10 \log 10(SA/ST) \quad \text{(Equation 1)}$$

wherein SA is the incident sound intensity (dB); and ST is the transmitted sound intensity (dB).

The compositions and properties of Examples 1 to 6 (E1 to E6) and Comparative Example 1 (C1) are provided in Table 3, wherein the amounts are in weight percent.

TABLE 3

|  | C1 | E1 | E2 | E3 | E4 | E5 | E6 |
|---|---|---|---|---|---|---|---|
| Component |  |  |  |  |  |  |  |
| PBT-1 | 16 | 6 | 6 | 6 | 6 | 9 | 9 |
| PBT-2 | 16 | 12 | 12 | 12 | 12 | 9 | 9 |
| PET | 47.3 | 26.3 | 26.3 | 17.6 | 26.3 | 26.3 | 26.3 |
| $BaSO_4$ |  | 35 |  |  |  |  |  |
| ZnS |  |  | 35 |  |  |  |  |
| Coated $TiO_2$ |  |  |  | 35 |  |  |  |
| ZnO |  |  |  |  | 35 |  |  |
| Tungsten |  |  |  |  |  | 35 |  |
| Iron oxide |  |  |  |  |  |  | 35 |
| GF | 20 | 20 | 20 | 20 | 20 | 20 | 20 |
| EBS wax | 0.3 | 0.3 | 0.3 | 0.1 | 0.3 | 0.3 | 0.3 |
| AO | 0.1 | 0.1 | 0.1 | 0.1 | 0.1 | 0.1 | 0.1 |
| Fine talc | 0.3 | 0.3 | 0.3 | 0.3 | 0.3 | 0.3 | 0.3 |
| Property |  |  |  |  |  |  |  |
| Specific Gravity | 1.4899 | 2.0179 | 2.0101 | 1.9952 | 2.2379 | 2.437 | 2.061 |
| Polyester $T_g$ (DMA) (° C.) | 74.8 | 79.7 | 84 | 79 | 76.5 | 73.8 | 73.6 |
| HDT at 0.45 MPa (° C.) | 223.6 | 201.5 | 206 | 149.5 | 193.4 | 222.2 | 217.9 |
| Tensile Modulus (MPa) | 7,108 | 7,944 | 8,710 | 6,490 | 8,676 | 10,500 | 10,500 |
| Tensile Strength (MPa) | 111 | 68.6 | 70.8 | 53.2 | 50.8 | 124 | 103 |
| MV (640/s, 260° C.) (P) | 326 | 467 | 331 | 239 | 459 | 740 | 337 |
| STL at 400 Hz (dB) | 15.1 | 31.5 | 24.3 | 34.8 | 29.5 | 32.1 | 31.8 |
| STL at 500 Hz (dB) | 21.7 | 26.9 | 26.4 | 27.5 | 25.8 | 24.0 | 25.6 |
| STL at 630 Hz (dB) | 28.6 | 25.8 | 25.7 | 22.1 | 21.8 | 19.6 | 17.3 |
| STL at 800 Hz (dB) | 27.5 | 27.9 | 27.4 | 25.2 | 28.1 | 29.2 | 27.6 |
| STL at 1000 Hz (dB) | 32.0 | 32.1 | 30.0 | 32.5 | 33.6 | 34.6 | 32.9 |
| STL at 1250 Hz (dB) | 35.2 | 39.4 | 32.6 | 37.2 | 38.4 | 38.6 | 37.2 |
| STL 1600 HZ (dB) | 37.1 | 37.0 | 33.6 | 40.0 | 39.8 | 42.5 | 40.8 |

For E1 to E6, PET was blended with PBT to achieve good mechanical/thermal mechanical strength and lower cost in the composition. PET use allows facile incorporation of post-consumer recycle (PCR) material with a higher melting point (254° C.), and PBT allows for fast crystallization giving molded articles with good dimensional stability; that is replicated mold tolerance and less than 10% change in dimensional stability when exposed to heat below 100° C. The combination of PBT-1 and PBT-2 provides flexibility to adjust the melt flow during the compounding process. DSC analyses showed that E1 to E6 each demonstrated two distinct melting temperatures at 215° C. and 245° C. on first and second heatings.

C1 represented a baseline formulation having 20 wt % of 10 micron diameter glass fibers. Examples 1 to 6 (E1 to E6) were prepared to include 20 wt % of glass fibers and 35 wt % of a metal filler having a specific gravity of greater than 3, resulting in composite materials with specific gravity in the range of 1.995 to 2.437 g/cm³. The metal oxide fillers such as $TiO_2$ (E3) and ZnO (E4) resulted in composite materials having less favorable thermal and mechanical properties, as demonstrated by reduced HDT temperature (less than 200° C.). Composites including $BaSO_4$ (E1) and tungsten (E5) provided greater sound transmittance loss (dB) in the frequency range of 1,000 to 1,250 Hz relative to C1.

Examples E7 to E12 were prepared to evaluate other amounts of $BaSO_4$ or tungsten in a PET-PBT polyester mixture again comprising a high and low Mw PBT to fine tune viscosity. Comparative Example C2 was prepared with a an increased loading of glass fiber and without a metal filler. The compositions and properties of E7 to E12 and C2 are provided in Table 4, wherein the amounts are in weight percent.

TABLE 4

|  | C2 | E7 | E8 | E9 | E10 | E11 | E12 |
|---|---|---|---|---|---|---|---|
| Component |  |  |  |  |  |  |  |
| PBT-1 | 11.5 | 14 | 11.5 | 9 | 2.6 | 4.6 | 5.9 |
| PBT-2 | 11.5 | 14 | 11.5 | 9 | 5.2 | 9.2 | 5.8 |
| PET | 36.4 | 41.4 | 36.4 | 26.4 | 11.5 | 20.5 | 17.6 |
| $BaSO_4$ |  | 10 | 20 | 40 | 60 | 35 |  |
| Tungsten |  |  |  |  |  |  | 50 |
| LLDPE |  |  |  |  | 10 |  |  |
| GF | 40 | 20 | 20 | 15 | 20 | 20 | 20 |
| EBS wax | 0.3 | 0.3 | 0.3 | 0.3 | 0.3 | 0.3 | 0.1 |
| AO |  |  |  |  | 0.1 | 0.1 | 0.1 |
| Fine talc | 0.3 | 0.3 | 0.3 | 0.3 | 0.3 | 0.3 | 0.3 |
| Property |  |  |  |  |  |  |  |
| Sp. G. | 1.66 | 1.56 | 1.76 | 2.10 | 2.69 | 1.89 | 3.30 |
| Tensile Modulus (MPa) | 8,124 | 4,372 | 5,660 | 7,134 | 15,540 | 6,040 | 12,700 |
| Tensile Strength (MPa) | 82.0 | 64.8 | 67.5 | 68.3 | 69.0 | 46.0 | — |
| MV = Viscosity (640/s, 260° C.) (P) | 458 | 332 | 377 | 390 | 608 | 343 | 652 |
| STL at 400 Hz (dB) | 30.3 | 26.7 | 21.1 | 31.5 | 25.1 | 32.3 | 24.5 |

TABLE 4-continued

| | C2 | E7 | E8 | E9 | E10 | E11 | E12 |
|---|---|---|---|---|---|---|---|
| STL at 500 Hz (dB) | 27.9 | 17.5 | 19.6 | 25.3 | 22.8 | 28.2 | 19.6 |
| STL at 630 Hz (dB) | 23.6 | 20.1 | 24.0 | 25.7 | 26.2 | 27.0 | 29.2 |
| STL at 800 Hz (dB) | 23.5 | 26.9 | 29.8 | 27.3 | 28.4 | 30.0 | 33.8 |
| STL at 1000 Hz (dB) | 30.7 | 31.0 | 33.1 | 33.1 | 32.9 | 33.1 | 38.1 |
| STL at 1250 Hz (dB) | 35.2 | 34.4 | 36.2 | 38.1 | 37.9 | 35.5 | 40.2 |
| STL at 1600 Hz (dB) | 38.5 | 36.7 | 39.1 | 41.2 | 37.8 | 37.2 | 42.8 |

The use of $BaSO_4$ and glass fibers in E7 to E10 resulted in a balance of mechanical and thermal properties, while providing sound transmittance loss. DSC analyses showed that E7 to E12 each had two distinct melting points (on first and second heats) of 215 and 245° C. The lower loading levels of $BaSO_4$ provided less noise reduction (E7 and E8). The use of 35 wt % $BaSO_4$ and 10 wt % LLDPE in E11 provided better sound transmittance loss in the frequency range of 800 to 1000 Hz as compared to 60 wt % of $BaSO_4$ alone in E10. E12 was prepared with 50 wt % tungsten and provided a significant reduction in sound transmittance especially at 1000 Hz (>6 dB) as compared to C1.

For Examples E13 to E17 and Comparative Example C3, dual layer articles were prepared to evaluate sound transmittance loss in multi-layer composites. Individual layers were prepared as 3.2 mm discs from compositions having 20 wt % glass fiber (layer B), 20 wt % GF and 35 wt % $BaSO_4$ (layer HV), or 20 wt % GF and 50 wt % tungsten (layer VHV). Two individual layers were then connected using a cyanoacrylate adhesive to form a laminated composite sample having a thickness of 6.4 mm. The laminate samples of E13 to E17 and C3 were evaluated for STL at frequencies from 400 to 1,600 Hz as described above.

Laminate samples of identical layers were prepared as C3 (B-B), E13 (HV-HV), and E14 (VHV-VHV). Table 5 shows the STL (dB) for laminate samples E14 to E15 and C3.

TABLE 5

| Frequency | C3 | E13 | E14 |
|---|---|---|---|
| 400 Hz | 53.6 | 55.8 | 47.6 |
| 500 Hz | 46.2 | 53.2 | 44.3 |
| 630 Hz | 43.4 | 50.5 | 39.6 |
| 800 Hz | 37.3 | 44.0 | 34.5 |
| 1,000 Hz | 28.5 | 37.7 | 37.3 |
| 1,250 Hz | 31.0 | 36.5 | 42.5 |
| 1,600 Hz | 38.4 | 39.5 | 47.6 |

Laminate samples having different layers were prepared as E15 (B-HV), E16 (B-VHV), and E17 (HV-VHV), and were each evaluated for STL in two configurations, with first one side exposed to the sound source and then the other side exposed. Surprisingly, both testing configurations gave similar results independent of whether the higher or lower density face was exposed to the sound source.

Table 6 shows the measured STL ($STL_M$) for E15 to E17, calculated STL ($STL_C$) for E15 to E17, and the difference (Δ) between the calculated and measured STL for E15 to E17 at frequencies from 400 to 1600 Hz. All values are in dB.

TABLE 6

| | E15 | | | E16 | | | E17 | | |
|---|---|---|---|---|---|---|---|---|---|
| Frequency | $STL_M$ | $STL_C$ | Δ | $STL_M$ | $STL_C$ | Δ | $STL_M$ | $STL_C$ | Δ |
| 400 Hz | 46.5 | 54.7 | −8.2 | 47.0 | 50.6 | −3.6 | 42.5 | 51.7 | −9.2 |
| 500 Hz | 43.2 | 49.7 | −6.5 | 39.8 | 45.3 | −5.5 | 38.5 | 48.8 | −10.3 |
| 630 Hz | 40.0 | 47.0 | −7.0 | 36.7 | 41.5 | −4.8 | 29.1 | 45.1 | −16.0 |
| 800 Hz | 32.3 | 40.7 | −8.4 | 25.9 | 35.9 | −10.0 | 32.3 | 39.3 | −7.0 |
| 1,000 Hz | 28.7 | 33.1 | −4.4 | 34.5 | 32.9 | 1.6 | 37.0 | 37.5 | −0.5 |
| 1,250 Hz | 35.9 | 33.8 | 2.1 | 40.9 | 36.8 | 4.1 | 41.7 | 39.7 | 2.0 |
| 1,600 Hz | 40.3 | 39.0 | 1.3 | 44.3 | 43.0 | 1.3 | 45.3 | 43.6 | 1.7 |

The STL as measured for individual layers C3, E13, and E14 were used to calculate $STL_C$ for the mixed laminate samples at each wavelength. As an exemplary calculation, the STL of the B-B laminate (C3) was added to the STL of the HV-HV laminate (E13), and the sum was then divided by 2 to give the expected (calculated) value for the sound loss of the B-HV mixed laminate (E15). The difference (Δ) between the calculated $STL_C$ and the measured $STL_M$ were determined at each wavelength. A similar method was used to determine the $STL_C$, $STL_M$, and Δ for E16 and E17.

At the lower wavelengths (e.g., 400, 500, 630, and 800 Hz) the $STL_M$ of the mixed laminates were from 3.6 to 16.0 dB less than the $STL_C$, meaning a negative Δ was observed. Surprisingly, at the higher wavelengths of 1,000 Hz or more the $STL_M$ of the mixed laminates were from 1.3 to 4.1 dB greater than the $STL_C$. Thus, at the higher wavelengths the positive Δ demonstrates a positive synergy from the use of the two dissimilar layers, as the observed STL was greater than the STL expected from the sum of the individual layers.

This disclosure further encompasses the following aspects.

Aspect 1: A polyester composition comprising, based on the total weight of the polyester composition, a first polyester and a second polyester, wherein a weight ratio of the first polyester to the second polyester is 80:20 to 20:80, preferably 60:40 to 40:60; 5 to 60 weight percent (wt %), preferably 5 to 50 wt % of a reinforcing filler; and 5 to 60 wt %, preferably 10 to 50 wt %, even more preferably 20 to 50 wt % of an inorganic filler having a specific gravity of greater than 3 grams per cubic centimeter, as determined in accordance with ASTM D792, wherein a molded article comprising the polyester composition has a sound transmission loss of greater than 30 dB, preferably 35 to 50 dB, more preferably 36 to 45 dB, as determined at 1,250 Hz according to ASTM E1050 using a molded disc with a diameter of 100 mm and a thickness of 3.2 mm.

Aspect 2: The composition of aspect 1, wherein the first polyester comprises a first poly(butylene terephthalate) and a second poly(butylene terephthalate), and wherein an intrinsic viscosity of the first poly(butylene terephthalate) is different than an intrinsic viscosity of the second poly (butylene terephthalate); or a weight average molecular weight ($M_w$) of the first poly(butylene terephthalate) is different than a $M_w$ of the second poly(butylene terephthalate); or both the intrinsic viscosities and the $M_w$ are different.

Aspect 3: The composition of aspect 1 or 2, wherein the second polyester comprises poly(ethylene terephthalate), poly(butylene terephthalate), poly(ethylene naphthanoate), poly(butylene naphthanoate), poly(cyclohexanedimethanol terephthalate), poly(propylene terephthalate), or a combination thereof.

Aspect 4: The composition of any one or more of aspects 1 to 3, wherein the first polyester and the second polyester each independently have a carboxylic acid end group concentration of 1 to 70 meq/kg, preferably 5 to 60 meq/kg, more preferably 10 to 50 meq/kg, as determined according to ASTM D7409; and a melting temperature from 200 to 275° C., preferably from 210 to 265° C., more preferably from 210 to 260° C., as determined by differential scanning calorimetry, preferably wherein the polyester composition has at least two separate melting temperatures from 200 to 275° C., as determined by differential scanning calorimetry.

Aspect 5: The composition of any one or more of aspects 1 to 4, wherein the reinforcing filler comprises glass, glass fibers, glass flakes, mica, or a combination thereof; preferably flat glass, cylindrical glass fibers, glass flakes, mica, or a combination thereof; more preferably flat glass, a combination of cylindrical glass fibers and glass flakes, mica, or a combination thereof.

Aspect 6: The composition of any one or more of aspects 1 to 5, wherein the inorganic filler comprises barium sulfate, tungsten, iron, zinc oxide, zinc sulfide, titanium dioxide, iron oxide, or a combination thereof, preferably barium sulfate or tungsten.

Aspect 7: The composition of any one or more of aspects 1 to 6, further comprising 0.01 to 0.5 wt %, preferably 0.01 to 0.3 wt % of a stabilizer, based on the total weight of the polyester composition; preferably wherein the stabilizer comprises a hindered phenol, phosphite, phosphonite, thioester, or a combination thereof.

Aspect 8: The composition of any one or more of aspects 1 to 7, further comprising 1 to 30 wt %, preferably 1 to 15 wt % of an impact modifier, based on the total weight of the polyester composition; preferably wherein the impact modifier comprises an alkyl (meth)acrylate copolymer, (meth) acrylic ester-butadiene-styrene, acrylonitrile-butadiene-styrene, styrene-butadiene, styrene-ethylene-butylene-styrene, a poly(ether ester) block copolymer, a polyethylene-α olefin copolymer, styrene-isoprene-styrene triblock copolymer, or a combination thereof.

Aspect 9: The composition of any one or more of aspects 1 to 8, wherein the molded article has one or more of a specific gravity of 1.2 to 4 $g/cm^3$, as determined in accordance with ASTM D792; a heat deflection temperature of 200 to 250° C., as determined in accordance with ASTM D648; a tensile strength of 50 to 200 MPa, as determined in accordance with ASTM D638; a tensile modulus of 3,000 to 20,000 MPa, as determined in accordance with ASTM D638; and a melt viscosity of 200 to 900 Poise, as determined at 260° C. at a shear rate of 640 radians per second in accordance with ASTM-D3835.

Aspect 10: A multi-layer composite comprising a first layer comprising a first polyester composition; and a second layer comprising a second polyester composition, wherein the first polyester composition and the second polyester composition are each the same or different polyester composition of any one or more of the preceding aspects.

Aspect 11: The composite of aspect 10, further comprising an adhesive layer disposed between the first layer and the second layer.

Aspect 12: The composite of aspect 10 or 11, having a total thickness of 1 to 30 mm, preferably 2 to 25 mm, more preferably 2 to 20 mm; a length 10 to 300 mm, preferably 20 to 250 mm, more preferably 20 to 200 mm; and a width of 10 to 300 mm, preferably 20 to 250 mm, more preferably 20 to 200 mm, preferably wherein the length and the width are the same or different, and are each independently at least one order of magnitude greater than the total thickness.

Aspect 13: The composite of any one or more of aspects 10 to 12, wherein the first polyester composition and the second polyester composition each independently has a specific gravity of 1.5 to 3.5 $g/cm^3$, preferably 1.8 to 3.5 $g/cm^3$, as determined in accordance with ASTM D792.

Aspect 14: The composite of aspect 13, wherein the composite has a sound transmission loss of greater than 45 dB, preferably 45 to 60 dB, more preferably 50 to 60 dB at 400 Hz; greater than 40 dB, preferably 40 to 60 dB more preferably 50 to 60 dB at 500 Hz; greater than 34 dB, preferably 34 to 50 dB, more preferably 40 to 50 dB at 800 Hz; greater than 32 dB, preferably 32 to 45 dB, more preferably 36 to 45 dB at 1250 Hz; and greater than 36 dB, preferably 36 to 50 dB, more preferably 38 to 50 dB at 1600 Hz, wherein the sound transmission loss is determined according to ASTM E1050 using a molded disc with a diameter of 100 mm and a thickness of 6.4 mm.

Aspect 15: The composite of any one or more of aspects 10 to 12, wherein the first polyester composition has a specific gravity of 1.2 to 2.0 $g/cm^3$, preferably 1.5 to 2.0 $g/cm^3$; and the second polyester composition has a specific gravity of 2.1 to 3.5 $g/cm^3$, preferably 2.3 to 3.5 $g/cm^3$, as determined in accordance with ASTM D792.

Aspect 16: The composite of aspect 15, wherein the composite has a sound transmission loss of greater than 40 dB, preferably 40 to 55 dB, more preferably 45 to 55 dB at 400 Hz; greater than 38 dB, preferably 38 to 50 dB, more preferably 40 to 50 dB at 500 Hz; greater than 25 dB, preferably 25 to 40 dB, more preferably 30 to 40 dB at 800 Hz; greater than 35 dB, preferably 35 to 50 dB, more preferably 40 to 50 dB at 1250 Hz; and greater than 40 dB, preferably 40 to 55 dB, more preferably 42 to 55 dB at 1600 Hz, wherein the sound transmission loss is determined according to ASTM E1050 using a molded disc with a diameter of 100 mm and a thickness of 6.4 mm.

Aspect 17: The multi-layer composite of any one or more of the preceding aspects, wherein the multi-layer composite is manufactured by providing a first layer precursor comprising the first polymer composition and a second layer precursor comprising the second polymer composition; and contacting the first layer precursor and the second layer precursor to provide the multi-layer composite.

Aspect 18: An article comprising the multi-layer composite of any one or more of the preceding aspects.

Aspect 19: The article of aspect 18, wherein the article is a sound insulating component.

Aspect 20: The article of aspect 19, wherein the sound insulating component is an automotive component.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, 5 to 20 wt %", is inclusive of the endpoints and all intermediate values of the ranges of "5 to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or". "Combination thereof" is an open ended term that includes one or more of the listed components and optionally can include other similar, non-listed components. Reference throughout the specification to particular aspects means that a particular element described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. As used herein, the terms "hydrocarbyl" and "hydrocarbon" refer to any chemical group comprising hydrogen and carbon. "Alkyl" means a branched or linear (i.e., "straight-chain"), monovalent saturated hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain unsaturated hydrocarbon group having at least one carbon-carbon double bond (e.g., ethenyl ($-HC=CH_2$) or propenylene ($-HC(CH_3)=CH_2-$)). "Alkynyl" means a straight or branched chain, monovalent unsaturated hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group. "Aryl" means a monovalent aromatic hydrocarbon group that can be a single ring or multiple rings (e.g., from 1 to 3 rings), which are fused together or linked covalently. "Arylene" means a divalent aryl group. "Alkylarylene" means an arylene group substituted with an alkyl group. "Arylalkylene" means an alkylene group substituted with an aryl group (e.g., benzyl). The term "halo" means a group or compound herein that includes one or more of a fluoro, chloro, bromo, or iodo substituent. A combination of different halo groups (e.g., bromo and fluoro), or only chloro groups can be present. The term "hetero" means that the compound or group herein is a stable group that includes at least one member that is a heteroatom (e.g., 1, 2, or 3 heteroatom(s)), wherein the heteroatom(s) is each independently N, O, S, Si, or P.

Unless substituents are otherwise specifically indicated, each of the foregoing groups can be unsubstituted or substituted, provided that the substituted atom's normal valence is not exceeded and the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g, toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$). When a compound is substituted, the indicated number of carbon atoms is the total number of carbon atoms in the compound or group prior to substitution. For example, $-CH_2CH_2CN$ is a cyano-substituted $C_2$ alkyl group.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A multi-layer composite, comprising:
   a first layer comprising a first polyester composition; and
   a second layer comprising a second polyester composition,
   wherein the first polyester composition and the second polyester composition are each the same or different polyester composition comprising, based on the total weight of the composite,
   a first polyester and a second polyester, wherein a weight ratio of the first polyester to the second polyester is 80:20 to 20:80;
   5 to 60 weight percent of a reinforcing filler; and
   5 to 60 weight percent of an inorganic filler having a specific gravity of greater than 3 grams per cubic centimeter, as determined in accordance with ASTM D792,
   wherein a molded article comprising the composite has a sound transmission loss of greater than 30 decibels, as determined at 1,250 Hertz according to ASTM E1050 using a molded disc with a diameter of 100 mm and a thickness of 3.2 mm,
   wherein the first polyester composition and the second polyester composition each independently has a specific gravity of 1.5 to 3.5 grams per cubic centimeter, as determined in accordance with ASTM D792.

2. The multi-layer composite of claim 1, further comprising an adhesive layer disposed between the first layer and the second layer.

3. The multi-layer composite of claim 1, having
a total thickness of 1 to 30 mm;
a length 10 to 300 mm; and
a width of 10 to 300 mm.

4. The multi-layer composite of claim 1, wherein the composite has a sound transmission loss of: greater than 45 decibels at 1,250 Hertz; and greater than 36 decibels at 1,600 Hertz, wherein the sound transmission loss is determined in accordance with ASTM E1050 using a molded disc with a diameter of 100 mm and a thickness of 6.4 mm.

5. The multi-layer composite of claim 1, wherein the first polyester in the composite comprises a first poly(butylene terephthalate) and a second poly(butylene terephthalate), and
wherein an intrinsic viscosity of the first poly(butylene terephthalate) and an intrinsic viscosity of the second poly(butylene terephthalate) are different; or a weight average molecular weight of the first poly(butylene terephthalate) and a weight average molecular weight of the second poly(butylene terephthalate) are different; or both the intrinsic viscosities and the weight average molecular weights are different.

6. The multi-layer composite of claim 1, wherein the second polyester in the composite comprises poly(ethylene terephthalate), poly(butylene terephthalate), poly(ethylene naphthanoate), poly(butylene naphthanoate), poly(cyclohexanedimethanol terephthalate), poly(propylene terephthalate), or a combination thereof.

7. The multi-layer composite of claim 1, wherein the first polyester and the second polyester in the composite each independently has a carboxylic acid end group concentration of 1 to 70 meq/kg, as determined according to ASTM D7409; and a melting temperature from 200 to 275° C., as determined by differential scanning calorimetry.

8. The multi-layer composite of claim 1, wherein the reinforcing filler comprises glass, glass fibers, glass flakes, mica, or a combination thereof.

9. The multi-layer composite of claim 1, wherein the inorganic filler comprises barium sulfate, tungsten, iron, zinc oxide, zinc sulfide, titanium dioxide, iron oxide, or a combination thereof.

10. The multi-layer composite of claim 1, wherein the composite further comprises 0.01 to 0.5 weight percent of a stabilizer, based on the total weight of the composite.

11. The multi-layer composite of claim 1, wherein the composite further comprises 1 to 30 weight percent of an impact modifier, based on the total weight of the composite.

12. The multi-layer composite of claim 1, wherein the multi-layer composite is manufactured by
providing a first layer precursor comprising the first polymer composition and a second layer precursor comprising the second polymer composition; and
contacting the first layer precursor and the second layer precursor to provide the multi-layer composite.

13. An article comprising the multi-layer composite of claim 1.

14. A multi-layer composite, comprising:
a first layer comprising a first polyester composition; and
a second layer comprising a second polyester composition,
wherein the first polyester composition and the second polyester composition are each the same or different polyester composition comprising, based on the total weight of the composite,
a first polyester and a second polyester, wherein a weight ratio of the first polyester to the second polyester is 80:20 to 20:80;
5 to 60 weight percent; and
5 to 60 weight percent of an inorganic filler having a specific gravity of greater than 3 grams per cubic centimeter, as determined in accordance with ASTM D792,
wherein a molded article comprising the composite has a sound transmission loss of greater than 30 decibels, as determined at 1,250 Hertz according to ASTM E1050 using a molded disc with a diameter of 100 mm and a thickness of 3.2 mm,
wherein the first polyester composition has a specific gravity of 1.2 to 2.0 grams per cubic centimeter; and the second polyester composition has a specific gravity of 2.1 to 3.5 grams per cubic centimeter, as determined in accordance with ASTM D792.

15. The multi-layer composite of claim 14, wherein the composite has a sound transmission loss of: greater than 40 decibels at 1,250 Hertz; and greater than 40 decibels at 1,600 Hertz, wherein the sound transmission loss is determined according to ASTM E1050 using a molded disc with a diameter of 100 mm and a thickness of 6.4 mm.

* * * * *